United States Patent [15] 3,643,013

Lemoine [45] Feb. 15, 1972

[54] DUAL LOOP EQUALIZATION FOR A FREQUENCY MODULATED SIGNAL SYSTEM

[72] Inventor: Maurice G. Lemoine, Redwood City, Calif.

[73] Assignee: Ampex Corporation, Redwood City, Calif.

[22] Filed: Oct. 8, 1970

[21] Appl. No.: 79,070

[52] U.S. Cl. ....................................178/6.6 A, 179/100.2 K

[51] Int. Cl. ........................................H04n 5/14, H04n 5/78

[58] Field of Search ......................178/6.6 A, 6.6 TC, 6.6 PS; 179/100.2 K, 100.2 T

[56] References Cited

UNITED STATES PATENTS 3,340,367 9/1967 Coleman et al. ....................178/6.6 A

*Primary Examiner*—Stanley M. Urynowicz, Jr.
*Assistant Examiner*—Steven B. Pokotilow
*Attorney*—Robert G. Clay

[57] ABSTRACT

In order to compensate for nonuniform frequency response of a video signal passed through a frequency modulation magnetic record/reproduce system, a compound equalization circuit having two concurrent modes of control is periodically and automatically adjusted by control signal information. The control signals are derived from a dual loop pilot signal insertion and extraction means which monitors the frequency response characteristics of the system, not only at the frequency of the pilot signal but also at both the black and white luminance levels of the video signal.

9 Claims, 6 Drawing Figures

INVENTOR.
MAURICE G. LEMOINE

BY

ATTORNEY

INVENTOR.
MAURICE G. LEMOINE
BY
Larry C. Jackson
ATTORNEY

INVENTOR.
MAURICE G. LEMOINE

BY

ATTORNEY

PATENTED FEB 15 1972

3,643,013

SHEET 4 OF 4

INVENTOR.
MAURICE G. LEMOINE

BY

Larry A. Jackson
ATTORNEY

DUAL LOOP EQUALIZATION FOR A FREQUENCY MODULATED SIGNAL SYSTEM

The present invention generally relates to circuitry for equalizing nonuniform frequency response characteristics of a signal system and more particularly to equalization circuitry useful in connection with frequency modulation signal systems.

Automatically controlled signal equalization has been found an essential feature for quality recording and reproduction of wideband signal information such as found in a television signal. For example, in U.S. Pat. No. 3,340,367, a playback equalization scheme is disclosed wherein a video signal, after having been frequency modulated, stored on a magnetic tape, and subsequently reproduced therefrom, is equalized to achieve a desired amplitude response versus frequency. In U.S. Pat. No. 3,381,083, such an equalization scheme is adapted to compensate for changing conditions in the record/reproduce system by continuously measuring the response characteristics of the video signal and automatically adjusting the equalization circuitry in accordance with the instantaneous requirements of the system.

While these schemes serve very well their intended objectives, there are nevertheless frequency response variations which remain uncorrected due to difficulty in providing comprehensive measurement thereof. For example, in the recording of frequency modulated video signals onto a magnetic medium, the signal retrieved during the reproduce mode is likely to have an amplitude/frequency response which continuously varies as the conditions of the recording and reproducing processes change. Such nonuniform frequency response is particularly troublesome in connection with the recording and reproducing of video signals on a magnetic disc recorder of the type disclosed in U.S. application, Ser. No. 713,901 filed Mar. 18, 1968 by Burnet M. Poole, which has been assigned to the assignee of the present application. Changing conditions such as the variation in head-to-disc writing speed which is a function of the radius of the various concentric tracks, variation in thickness of the plated magnetic medium carried by the disc surface, and differences in the response characteristics among the several record/reproduce heads, all contribute to significant and continuous fluctuations in the amplitude versus frequency response to which the various frequency components of the modulated signal are subjected. Systems heretofore employed to compensate for similar effects in connection with wideband tape recording equipment have been found inadequate for eliminating signal distortion in disc recording systems, particularly those adapted for color television signals which require a greater degree of signal resolution than black and white video signals.

Accordingly, it is an object of the present invention to provide an automatic equalization scheme having a more comprehensive control over frequency response variations in systems through which a video signal is passed.

It is a further object of the present invention to provide such an equalization scheme particularly adapted to compensate for undesirable frequency effects in a magnetic recording system for video signals.

Still another object of the present invention is to provide an equalization scheme for use in a frequency modulation video recording system wherein distortion caused by nonuniform frequency response at frequencies associated with different amplitude levels of the video signal is automatically corrected.

These and other objects are achieved in accordance with the present invention, by a system in which information for achieving the controlled equalization is obtained from two feedback loops, one of which monitors the frequency response of a pilot signal biased to a certain amplitude level of the video signal, such as black luminance, while the other feedback path monitors a pilot signal associated with a different amplitude level, such as white luminance. In an FM system, the different amplitude levels are converted into different frequency levels in the frequency modulated signal. By utilizing error information obtained at two points on the frequency spectrum, variations in the video amplitude being translated into frequency variations of the frequency modulated signal, a more comprehensive and refined equalization is obtained. The information associated with each loop is fed to a compound equalization circuit which has the ability to control not only the equalization at the particular frequency of pilot signal but also has the capability of adjusting for nonuniform frequency effects associated with white to black luminance variations of the video signal. While reference is made to equalization compensation at black and white video levels, it will be appreciated that these corrections improve the resolution of the entire video signal including color information carried thereby.

In the preferred embodiment of the invention as described herein, the equalization scheme is disclosed for use on a magnetic disc recording system of the type found in U.S. application, Ser. No. 713,901 wherein the video signal is recorded in field segments. Each field is recorded on a single concentric track of the disc and the record/reproduce head is articulated in radial steps between the various concentric tracks. Thus in order to achieve the most advantageous equalization for this type of system, the present invention provides for measuring the frequency response characteristics associated with each concentric track, adjusting the equalization in accordance therewith, and maintaining the determined equalization throughout the reproduction of the video field or frame associated with that particular track. By gathering sufficient frequency response information during the vertical blanking interval and thereafter holding the equalization constant throughout the succeeding video field, the present invention has the advantage over systems in which the frequency response information required for adjusting the equalization is acquired continuously during the entire video field sequence. Such prior schemes require the lapse of approximately one video field in order to gather enough information to provide proper equalization. This mode of operation is unsuited for video disc recording systems of the type described above, wherein each field may be reproduced only once (the record/reproduce head being stepped to reproduce another field immediately thereafter).

In accordance with the present invention, a sequence of operations are performed whereby a pilot signal of desired frequency is inserted during certain portions of the video signal blanking interval and is later extracted from the video signal after it has been passed through the frequency modulating, recording and reproducing system. The frequency response of such extracted pilot signal is thereupon compared with a predetermined reference level and any disagreement therebetween causes an error or control signal to be fed to and for correcting the equalization circuitry. The time periods of the pilot signal are sufficiently long in order to allow for the development of adequate compensation information during the vertical blanking interval to achieve proper equalization for the entire succeeding video field.

These and other objects, features and advantages of the invention will become apparent from the following description and accompanying drawings describing and illustrating the preferred embodiment of the invention, wherein.

Figure 1:
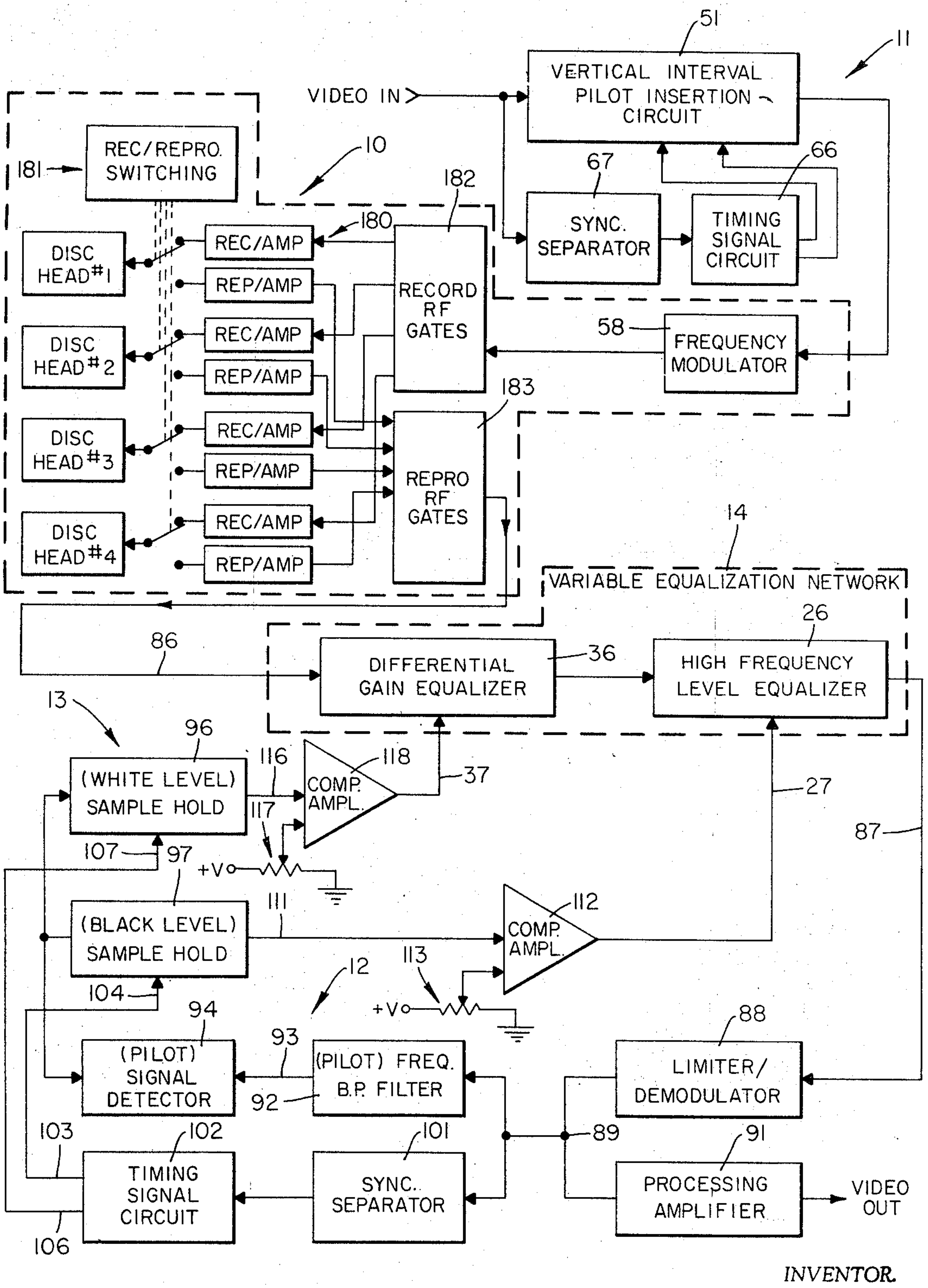
FIG. 1 is a detailed block diagram of the circuitry employed in the dual loop equalization scheme of the present invention.

With reference to FIG. 1, the dual loop equalization method and circuit of the present invention is illustrated in conjunction with a magnetic disc record/reproduce system 10 of the type employing frequency modulation. Furthermore, in this instance system 10 is adapted for recording and thereafter reproducing a video signal in which the signal is initially frequency modulated, thereupon recorded and subsequently reproduced in its frequency modulated form and finally reconverted to its original signal condition by a frequency demodulation process. It will be appreciated that the resulting video signal will be subjected to distortion if the record/reproduce system 10 exhibits any nonuniform frequency response characteristics which are not equalized or otherwise compensated.

In accordance with the present invention, changing frequency response conditions of system 10 are periodically monitored at different amplitude levels of the incoming video signal by a combination of circuits including a pilot signal insertion means generally shown at 11 and disposed in the signal path preceding system 10; a pilot signal extraction means generally indicated at 12 and disposed in the signal path subsequent to passage of the video signal through system 10; and comparator means shown generally at 13 for continuously comparing the response of the processed pilot signal with predetermined reference signal levels. As indicated, the pilot signal, consisting of a preselected relatively high frequency in the video signal spectrum, is inserted, extracted and monitored at different video amplitude levels so as to obtain information as to the frequency response of system 10 at such different levels. It is noted that the different video amplitude levels to which the pilot signal is biased are transformed into different frequency levels after the signal has been frequency modulated within system 10. In order to utilize the frequency response information gathered by this dual amplitude or frequency level system, a variable equalization network 14 is provided having two dimensions or modes of frequency equalization control. In particular, one of the equalization controls of network 14 is disposed to respond to the comparison between a preselected reference signal and the frequency response of the pilot signal associated with one video bias level while the remaining equalization control is disposed to respond to the frequency response of the pilot signal associated with another bias level.

Figure 2:
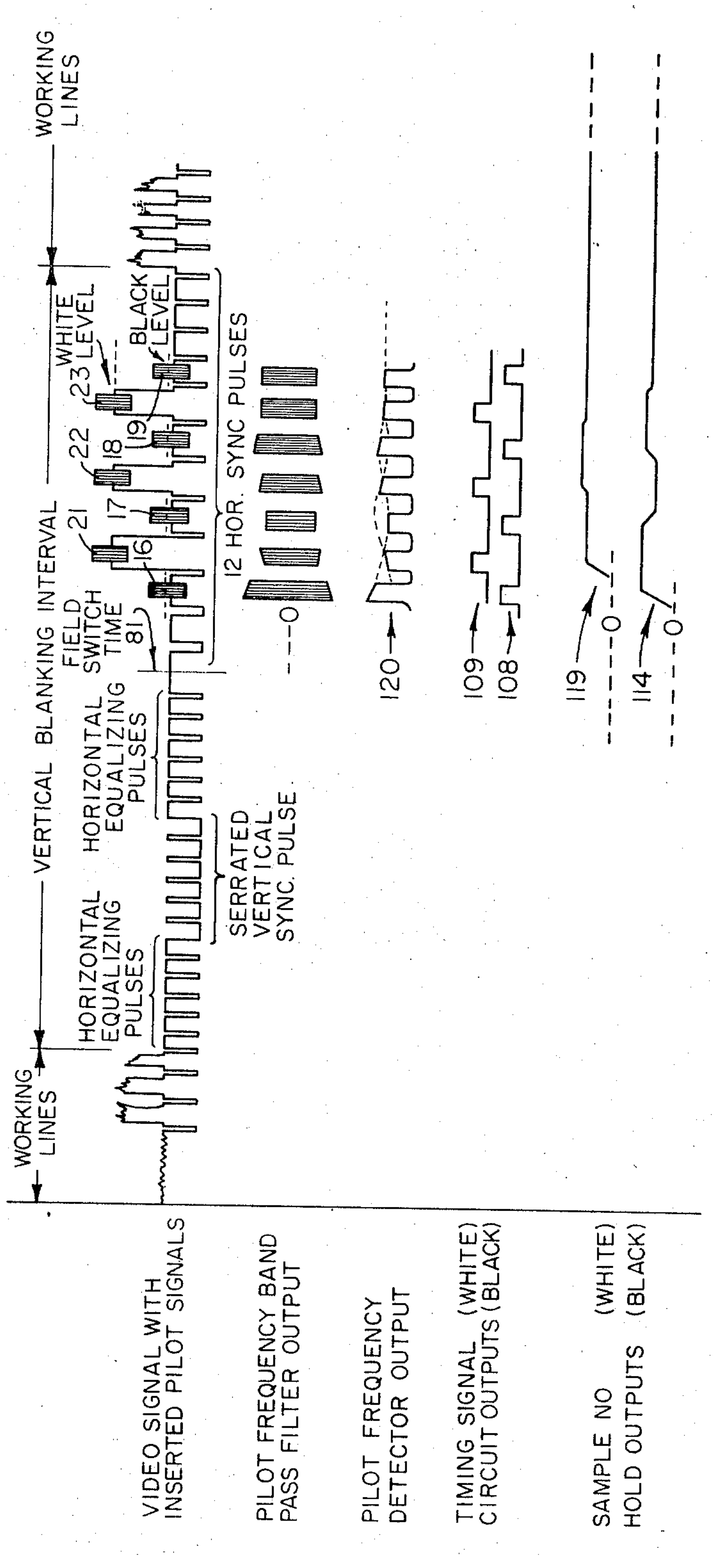
FIG. 2 is a graph illustrating various waveforms occurring in the system of FIG. 1 during operation thereof.
Figure 3:
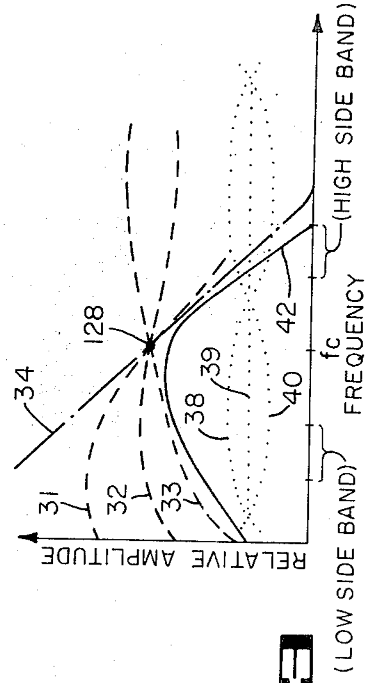
FIG. 3 is another graph illustrating the relationship between the various modes of frequency response control available from the equalization network of FIG. 1.

With reference to FIGS. 2 and 3, the foregoing operation is illustrated by various signal waveforms and frequency response curves occurring during operation of the system of FIG. 1. In particular, FIG. 2 illustrates a video signal which has been processed by the pilot signal insertion means 11 such that two sets of pilot signal bursts, 16, 17, 18, 19 and 21, 22, 23 are formed on and carried by the video signal. In this instance, and as preferred, pilot bursts 16–19 and 21–23 have been disposed on certain inactive portions of the vertical blanking interval of the video signal. Each of bursts 16–19 and 21–23 is comprised of a timed envelope of a relatively high frequency pilot signal. Moreover, the set of pilot signal bursts 16–19 has an average or bias amplitude level corresponding to a selected amplitude level of the video signal, in this instance being the luminance black level, while the set of pilot signal bursts 21–23 is comprised of the same relatively high signal frequency but biased to a different video amplitude level, in this instance corresponding to the luminance white level. The referred to levels correspond substantially to the extremes of "all white" or "all black" on the television monitor screen with the shaded or gray elements of the picture lying therebetween. Once the video signal, including the waveforms appearing during the vertical blanking interval, have been frequency modulated prior to recording on the magnetic medium, the pilot signal bursts 16–19 biased to luminance black are transformed into one set of sideband frequencies while pilot signal bursts 21–23 associated with chrominance white are converted into yet another set of sideband frequencies.

In accordance with the invention, pilot signal bursts 16–19 are employed as a measure of equalization required at black luminance and for control of the overall or wideband frequency equalization applied to the reproduced frequency modulated video signal while the pilot signal bursts 21–23 biased to luminance white are used as a measure and control of the equalization required for differential frequency effects in system 10 associated with black to white amplitude variations of the unmodulated video signal.

With reference to FIGS. 1 and 3, variable equalization network 14 is capable of responding to the control information provided by monitoring the pilot signals to effect two dimensions or modes of frequency equalization control. For example, network 14 is comprised of a wideband frequency equalizer 26 having a control input 27 responsive to an output of comparator means 13 corresponding to the frequency response of the black level bursts 16–19. In FIG. 3, the dotted lines 31, 32 and 33 represent a range of frequency equalization control capable of being performed by equalizer 26 in response to a signal at its input 27. Included within the circuitry of equalizer 26 is a low pass filter which provides a straight line fall-off equalization indicated by the dash-dot line 34 in FIG. 3, wherein this low pass filter has the effect of cutting off the relatively higher frequency characteristics of curves 31–33.

Network 14 is further comprised of a differential gain equalizer 36 having a control signal input 37 responsive to variations in the frequency response of the white level pilot signal bursts 21–23 to provide the mode of frequency equalization control indicated by dotted line equalization curves 38, 39 and 40 of FIG. 3. It is noted that equalizer 36 is effective primarily at lower frequencies, particularly at those frequencies associated with the lower sideband, as indicated, of the FM video signal.

The frequency response of network 14 as a result of the combined equalization effects of equalizers 26 and 36 is in this instance shown by a resultant curve 42. It will be noted that the effective equalization for frequencies below the carrier frequency, $f_c$, can be significantly altered by adjusting one or both of equalizers 26 and 36. For example, the resultant response curve 42 can be provided with a relatively higher overall amplitude response for the carrier frequency, $f_c$, and lower sideband frequencies by adjusting equalizer 26 in a direction corresponding curve sequence 33-32-31. Adjustments of differential gain equalizer 36 have the effect of differentially controlling the response of frequencies within the lower sideband. For example, by setting equalizer 36 to provide an equalization corresponding to curve 38, it will be noted that the resultant curve 42 is altered so as to exhibit a relatively flat response over the entire frequency spectrum of the lower sideband. Curve 38, when added to curve 33, has the effect of emphasizing frequencies at the low end of the lower sideband while deemphasizing frequencies adjacent the higher end of the lower sideband so as to achieve this response. Finally, curve 42 provides the desired equalization at the higher frequency range, wherein the higher sideband is so attenuated that its amplitude approaches zero relative to the amplitudes of the lower sideband and carrier frequencies. This characteristic has been found essential to quality recording and reproduction of video signals by frequency modulation techniques. As indicated, equalization at the high end of the frequency spectrum is to a large extent provided by the low-pass filter of equalizer 26 which exhibits a straight line response curve 34. Thus, it will be seen that the present invention by providing two equalization loops achieves a more comprehensive measurement of the required equalization and at the same time provides an added dimension of equalization control for utilizing this measured information. As indicated above, the greater degree of equalization control is highly advantageous in connection with the recording and reproducing of frequency modulated video signals on a magnetic disc, where the conditions under which the signal is recorded and reproduced are subject to substantial variation from one video field to the next.

Figure 6:
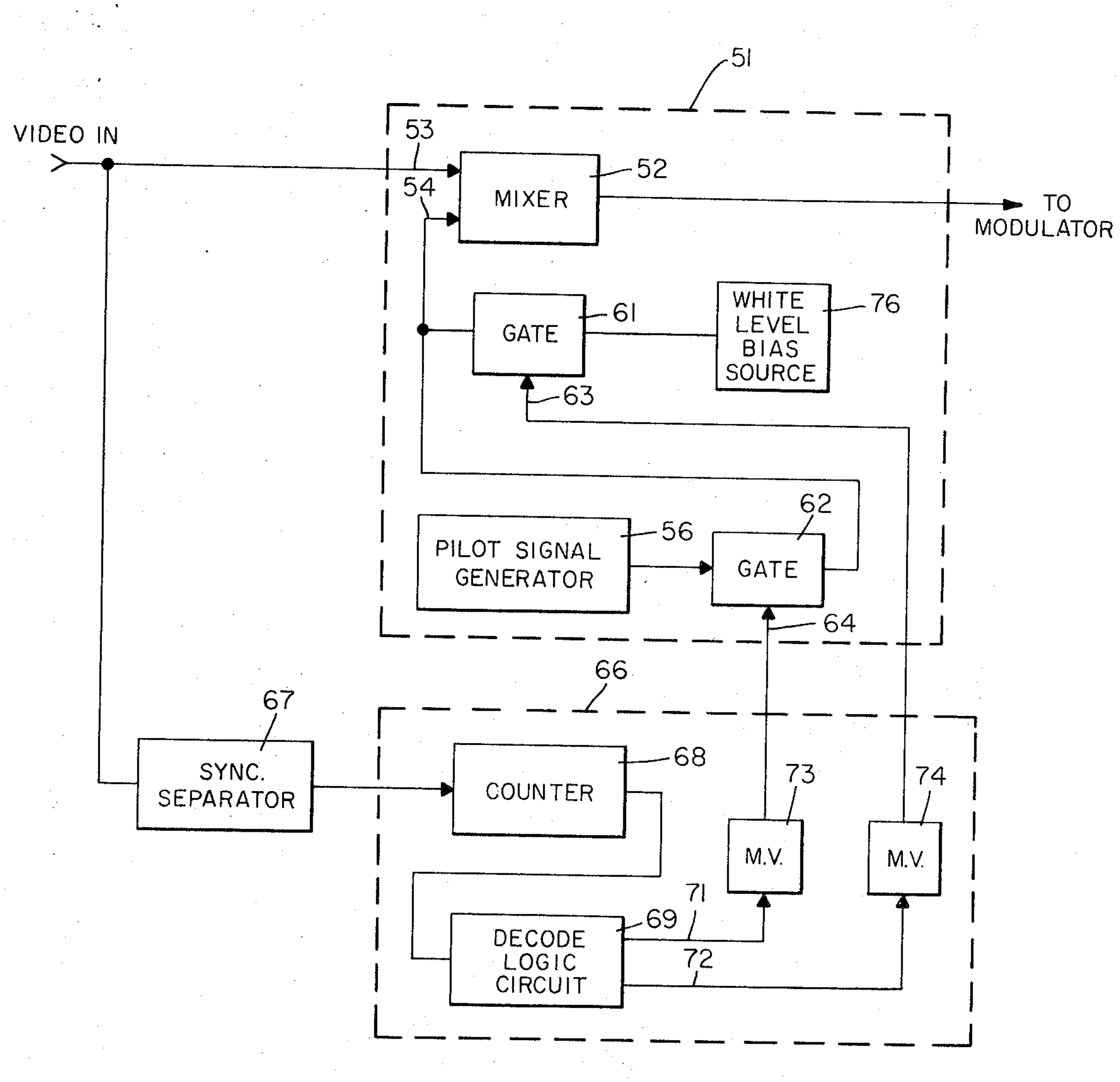
FIG. 6 is a block diagram illustrating a circuit which has been found suitable for performing the function of certain components generally illustrated by FIG. 1.

Referring to FIGS. 1 and 6, the particular circuitry employed for inserting the pilot signal bursts includes a vertical interval pilot insertion circuit 51 which, as detailed in FIG. 6, consists of a signal mixer 52 having an input 53 for receiving the incoming video signal and an input 54 disposed to receive a gated and selectively biased relatively high frequency signal produced by a pilot signal generator 56. Mixer 52 is further provided with an output 57 which extends to a frequency modulator 58 of record system 10. The video signal with inserted pilot signal bursts as shown in FIG. 2 represents the signal appearing at mixer output 57 during the vertical blanking interval. In order to dispose the pilot signal bursts 16–19 and 21–23 at proper time locations relative to the vertical blanking interval, insertion circuit 51 further comprises electrical gates 61 and 62 having control inputs 63 and 64 respectively responsive to a timing signal circuit 66 which in turn is controlled by the video amplitude transitions associated with the vertical blanking interval as developed by a sync separator 67. In particular, sync separator 67 is disposed to receive the incoming video signal and to extract the electrical pulses thereof associated with the vertical blanking interval. Circuits capable of performing this function are well known in the art and thus no further description of this component is warranted. The output of separator 67 thus issues a train of electrical pulses having a sequence representing a first set of horizontal equalization pulses, followed by the serrated vertical sync pulse, which in turn is followed by another set of horizontal equalization pulses, and finally by a set of approximately 12 horizontal line sync pulses. The sequence in which these various signal transitions or pulses occur is shown in FIG. 2.

Timing circuit 66 is comprised of a counter 68 disposed to receive and register the count of vertical blanking interval pulses issued by separator 67, while a decode logic circuit 69 disposed to respond to the accumulated pulse count provided by counter 68 is programmed in a well-known manner to issue signals over a pair of outputs 71 and 72 having the desired timing relationship with the vertical blanking interval. In particular, the signal output on line 71 from circuit 69 is selected to operate the control input 64 of gate 62 through a monostable multivibrator 73 to cause pilot signal generator 56 to be connected to input 54 of mixer 52 during the time intervals indicated by the width of pilot signal bursts 16, 17, 18 and 19 as shown in FIG. 2. Monostable multivibrator 73 in particular issues a pulse of desired timewidth, corresponding to the desired width of bursts 16–19, each time a trigger signal appears on decode output 71 of circuit 69. Circuit 69 is in turn programmed so that output 71 issues such a trigger pulse in response to each of seven horizontal line sync pulses following the two such horizontal line sync pulses which appear after the second set of horizontal equalizing pulses as shown by FIG. 2. Output 72 of decode circuit 69 is programmed so as to issue a trigger pulse to a multivibrator 74 which in turn operates a control input 63 of a gate 61 to enable a white level bias source 76 to be connected to input 54 of mixer 52 along with the pilot signal from generator 56. Output trigger pulses appear on line 72 in response to each of the three horizontal line synchronizing pulses following black level pilot signal bursts 16, 17 and 18. This particular location for the insertion of pilot bursts 16–19 and 21–23 has been selected for the present embodiment as it follows the field switch time 81 at which the disc recorder is designed to switch between the record or reproduce of a video field on one concentric disc track to a different field on another concentric disc track.

The frequency of the pilot signal is preferably selected to be in the approximate band range of video information subject to frequency response errors, such as the color information. Accordingly, for the present embodiment, the pilot signal has been selected to have a frequency of 4 megacycles which lies between the two most commonly employed color subcarrier standards.

In the foregoing manner, the pilot signal bursts are disposed at the immediate front of each video signal field recorded on any given concentric track of the disc. Furthermore, the location of the pilot signal bursts is such that they do not interfere with any of the video information preceding or following the vertical blanking interval. After the desired frequency response information is obtained from pilot signal bursts 16–19 and 21–23, these bursts are removed from the video signal in a well-known manner so as not to interfere with the normal video picture blanking function provided by the standard vertical blanking waveform.

Again referring to FIG. 1, after the frequency modulated video signal, with inserted pilot signal bursts, has passed through record/reproduce system 10, it is fed over a line 86, through variable equalization network 14, and over a line 87 to a combined limiter/demodualtor circuit 88 which demodulates the signal and restores it to its condition prior to its passage through system 10. Any distortion of the video signal due to nonuniform frequency response effects which have not been compensated for by equalization network 14 are exhibited in the signal as it appears at junction 89 at the output of demodulator 88. The signal at junction 89 is fed through a processing amplifier 91 of conventional and well-known construction, which issues the usable outgoing video signal. Processing amplifier 91 functions to remove the pilot signal bursts 16–19 and 21–23 and restore the various synchronizing waveforms of the video signal to acceptable resolution standards.

In addition, the video signal at junction 89 is returned in a feedback loop to and for controlling equalization network 14, wherein the feedback path has two distinguishable loops corresponding to the black and white bias levels, respectively, of the inserted pilot signal. The dual feedback loops are formed by pilot signal extraction means 12 in combination with comparator means 13 wherein the sets of pilot signal bursts associated with the different bias levels are separated and individually compared with a predetermined reference level.

Extraction means 12 comprises a bandpass filter 92 having a bandpass frequency centered at the pilot frequency so as to pass each of the pilot frequency bursts 16–19 and 21–23 to an output 93. The amplitudes of the retrieved pilot signal bursts are detected by pilot signal detector 94 and passed jointly to separate sample and hold circuits 96 and 97 corresponding respectively to the white and black bias levels.

Pilot signal extraction means 12 further includes a sync separator 101 and a timing signal circuit 102 which may be provided by circuitry identical or equivalent to that of sync separator 67 and timing signal circuit 66 described above and illustrated in greater detail by FIG. 6. In fact, while these circuits are shown as separate units, in practice it has been found convenient to utilize the same physical circuit for performing both the pilot insertion operations during record modes and subsequently for performing the pilot extraction operations during a reproduce mode. Thus, sync separator 101 provides pulse information to timing signal circuit 102 which responsively issues a series of black level sample pulses over output line 103 which is connected to the sample control input 104 of the black level sample and hold circuit 97. Similarly, white level timing pulses are issued over an output line 106 from circuit 102 which is extended to the sample control input 107 of white level sample and hold circuit 96. The respective black and white level timing pulses issued by circuit 102 are illustrated by pulse waveforms 108 and 109 respectively in FIG. 2. By this arrangement, circuits 96 and 97 are selectively and alternately enabled so as to sample the amplitudes of the pilot signal at the appropriate times associated with the white and black levels. Thus, an output 111 of sample and hold circuit 97 provides a signal to a comparator amplifier 112 which compares the sampled amplitude of the black level pilot signal obtained from sampled bursts 16, 17, 18 and 19 with a preset reference voltage level made available from variable resistance network 113. Depending upon the magnitude and polarity of any difference between the desired amplitude of the black level pilot bursts and the reference level as determined by network 113, a signal is issued by comparator 112 to input control 27 having the proper magnitude and polarity for adjusting equalizer 26 to correct the amplitude of the reproduced FM video signal and thus of the pilot bursts 16–19. A typical amplitude variation of the signal issued at output 111 of sample and hold circuit 97 is shown by waveform 114 in FIG. 2.

Similarly, sample and hold circuit 96 has an output 116 issuing a signal reflecting the amplitude of the reproduced pilot bursts 21, 22 and 23 at the white luminance level. This actual frequency response measurement of pilot signal bursts 21–23 is compared to a preset reference level obtained from variable resistance network 117, wherein each of these signals are fed to separate inputs of a comparator amplifier 118. Amplifier 118 responds in polarity and magnitude to registered differences between these signals to issue a correction feedback signal to input control 37 of differential gain equalizer 36 to provide a frequency equalization change in the reproduce signal path necessary to compensate for the discrepancy sensed by comparator amplifier 118. A typical amplitude variation of the signal appearing at output 116 is shown by waveform 119 in FIG. 2. It is noted that waveform 120 showing the amplitudes of the various pilot signal bursts at the output of detector 94 tends to settle or decay toward a stabilized level as the corrective action of the black and white feedback loops take effect. Thus, the waveforms 114 and 119 at the output of sample and hold circuits 97 and 96 have stabilized at a proper level by the time the last timing signal pulses in waveforms 108 and 109 have arrived.

The waveforms of FIG. 2 demonstrate another feature of the invention wherein it is noted that each of the feedback loops tend to influence the response to the other such that the feedback correction is achieved by a cooperative effort between the two loops working toward a final equalization control condition. It has been found through experimentation that sufficient feedback information is obtained by using the illustrated seven pilot bursts 16–19 and 21–23, having a timewidth occupying approximately three-fourths of the available time spacing between adjacent horizontal sync pulses. A fewer number of pilot bursts or bursts of less time duration may result in incomplete equalization correction in the present embodiment of the invention. A greater number of bursts could be provided depending upon the application. However, in the present embodiment of the invention, the remaining locations associated with the horizontal sync pulses are utilized for other purposes, such as for carrying test signals.

Figures 4, 5:
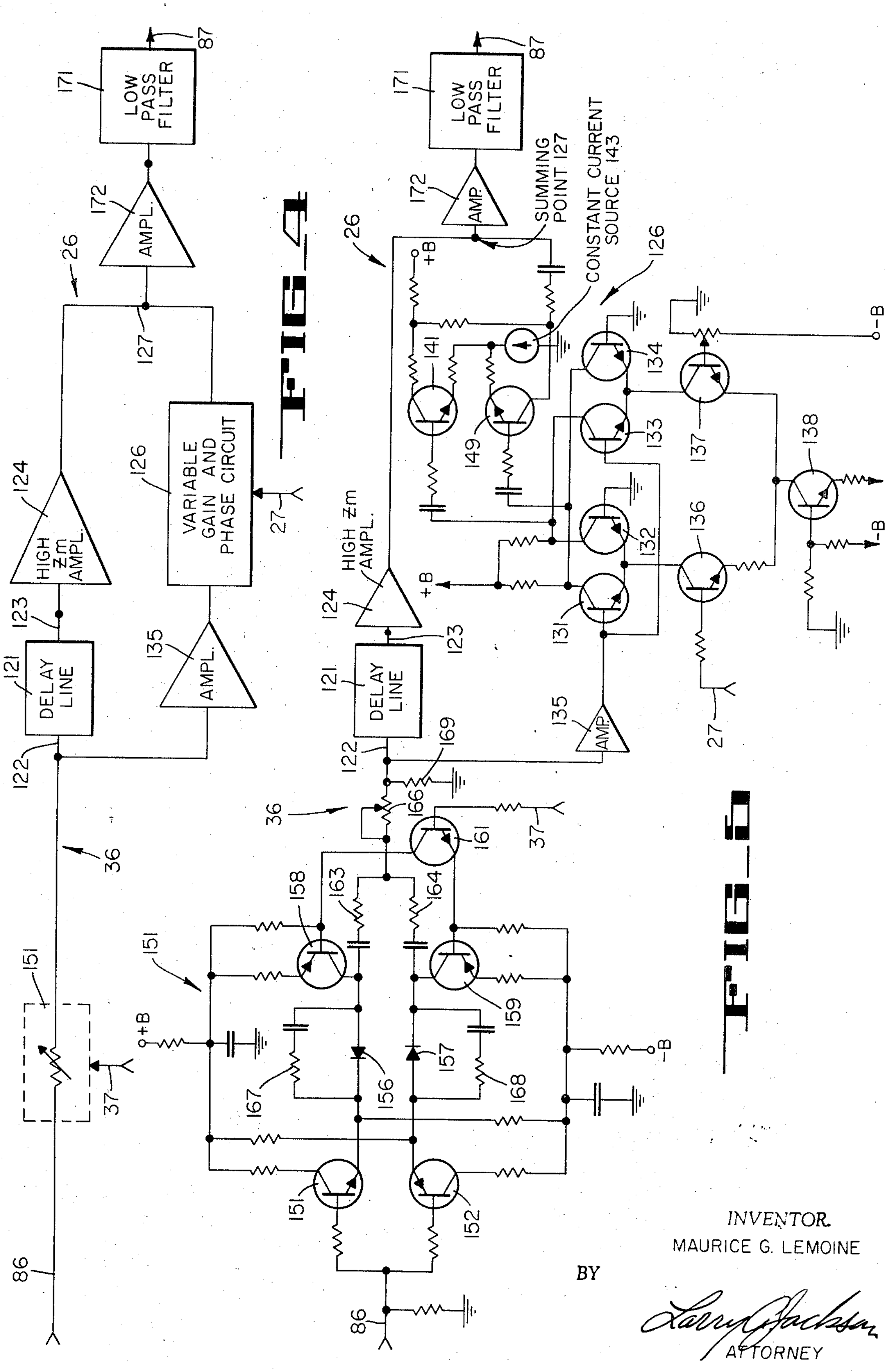
FIG. 4 is a block diagram illustrating the principal operating components of the equalization network of FIG. 1.
FIG. 5 is a detailed circuit diagram of the equalization network of FIGS. 1 and 4.

With reference to FIGS. 4 and 5, a preferred construction of equalization network 14 is illustrated wherein the block diagram of FIG. 4 indicates in general the essential components of the circuit and FIG. 5 shows in more detailed form the circuitry actually employed. While network 14 is illustrated in FIG. 1 as being comprised of two separate equalizers 26 and 36, in practice it has been found preferable to use a compound equalization network having two dimensions of equalization control centered about the use of a single delay means or delay line 121 as shown. While network 14 may be constructed with two entirely separate circuits corresponding to equalizers 26 and 36 and each employing a separate delay line, the present construction is preferred due to its more simplified and less expensive form.

As in the case of known equalization circuits employing delay lines, the compound equalization circuit of the present invention functions to utilize signal reflections from an unterminated end of a delay line, in this instance delay line 121, to either emphasize or deemphasize certain signal frequencies within a known range or frequency band. In particular, signals received at a terminated sending end 122 of delay line 121 are eventually reflected at an unterminated receiving end 123 of the line, returned to the sending end and at that point either constructively or destructively combined (due to phase differences) with the incoming signal to emphasize or deemphasize certain portions of the frequency spectrum. The reference to end 123 of line 121 as being unterminated refers to the effective open circuit impedance condition existing at that point, wherein the input impedance of a receiving amplifier 124 is selected to be very much higher, by several orders of magnitude, than the characteristic impedance of delay line 121 such that end 123 of the line appears essentially as an open circuit. In known equalizers, the signal at the receiving end, such as end 123, is combined with the signal appearing at the sending end, corresponding to end 122, such that the voltage at the receiving end of the delay lines remains substantially constant with signal frequency, while the voltage at the sending end varies cosinusoidally with frequency because of phase change of the reflected signal. At a frequency where the delay line, such as delay line 121, is equal to a half-wave, the signals at the sending end and the receiving end are inphase and combine to emphasize the resulting signal: A known equalizer similar to that of the present invention is described in U.S. Pat. No. 3,340,367. The equalizer circuit disclosed in that patent is modified as described in U.S. Pat. No. 3,381,083 to be continuously variable in response to a control signal by providing a controlled gain in the signal path between the sending end of the delay line and the point of summation with the signal developed at the receiving end.

In accordance with the present invention, the portion of the equalization circuitry corresponding to equalizer 26 as shown in FIG. 4 is provided with a circuit 126 which not only controls the gain in the signal path between sending end 122 and a summing junction 127 as in known equalizers, but in addition thereto circuit 126 provides a controlled change in phase in this signal path so as to greatly increase the range over which equalizer 26 is effective. In particular, circuit 126 responds to the polarity and amplitude of a signal appearing at input control 27 to provide a transfer function which can be varied from a relatively high negative gain (phase reversed), through zero gain, to a relatively high positive gain (phase unchanged). This control results in an equalization change demonstrated in FIG. 3, wherein equalization curve 31 corresponds to circuit 126 being adjusted to provide a relatively high negative gain so that lower frequencies are emphasized. Curve 32 corresponds to a substantially zero gain and is thus relatively flat. Curve 33 represents a relatively high positive gain pursuant to which lower frequencies are attenuated. It will be noted that curves 31, 32 and 33 provide a range of equalization control which pivots through point 128 wherein curve 31 varies cosinusoidally with frequency, curve 32 is relatively flat and curve 33 varies cosinusoidally with frequency.

Variable gain and phase circuit 126 may be provided by any number of known circuit configurations, such as the one shown in FIG. 5 which has been found suitable in practicing the present invention. Transistors 131 and 132, 133 and 134 constitute two balanced variable gain amplifiers. The gain is controlled by varying the amount of current supplied to each pair by transistors 136 and 137, respectively. Transistors 136 and 137 in turn are supplied with a constant current by transistor 138. The control signal voltage applied to input 27 controls the current in transistor 136, and indirectly the current in transistor 137, since at any time their sum is a constant. When the current increases in transistor 136, it decreases by the same amount in transistor 137.

The same radio frequency (RF) signal developed by amplifier 135 is applied to the inputs of both amplifiers (at bases of transistors 131 and 133), and their outputs are connected in such a way as to obtain signal cancellation when their gains are equal (as shown at the interconnected collectors of transistors 131 and 134 and of transistors 132 and 133).

When the gain is increased in one of the amplifiers, with a corresponding decrease in the other, the output signal from these transistors is equal to the difference of the two outputs with the phase of the stronger predominating.

Transistors 141 and 142 and a constant current source 143 are connected as a balanced amplifier for the purpose of decreasing even harmonics generated by low current operation of transistors 131, 132 or 133, 134 at the extreme ends of the operating range of gain control.

In addition to the control provided by circuit 126 of equalizer 26, a further dimension of equalization control is provided by a variable impedance 151 coupling the frequency modulated video signal appearing over line 86 to the input or sending end of 122 of delay line 121. Variable impedance 151, which is diagrammatically illustrated in FIG. 4, is responsive to the control signal applied at control input 37 to vary this impedance over a range centered about the characteristic impedance of delay line 121. It has been found that a variation of impedance 151 in this manner has the effect of modifying the overall equalization provided by network 14 to the extent indicated by dotted equalization curves 38, 39 and 40. In particular, by controlling input 37 such that impedance 151 substantially matches the characteristic impedance of delay line 121, then the equalization curves associated with equalizer 26 remain unchanged and this situation is represented by the relatively flat response of the dotted equalization curve 39. By increasing or decreasing variable impedance 151 with respect to the characteristic impedance of line 121, certain frequencies are either emphasized or deemphasized as shown by dotted line curves 38 and 40. The frequencies affected in this regard depend upon the delay of line 121 and the degree to which the variable impedance 151 mismatches the line impedance. As indicated above, this added dimension of control permits the resulting equalization curve available from network 14 to be modified such that the entire frequency spectrum contained by the lower sideband of the FM video signal can be properly compensated.

When a signal is applied to a nonterminated delay line, such as line 121, the electrical energy is reflected upon reaching the nonterminated end and returned to the source. If the source impedance is equal to the characteristic impedance of the line, all of the returning energy is absorbed. However, if the source impedance differs from the line impedance, a part of the energy is reflected back into the line, and the voltage at the nonterminated end thereof will be the vectorial sum of the original input signal and the reflected signal. The phase of the reflected signal relative to the original input signal is $\pm(4\pi t)/T$ where $t$ is the delay period of the line and T is the period of the signal. The sign ($\pm$) depends upon the value of the source impedance. When the source impedance is greater than the line impedance the reflection is in phase with the source, and if the opposite condition exists the reflected signal is 180° out-of-phase with the source signal.

In this instance, the value for variable impedance 151 will be represented as R. For a frequency of 7 MHz (the carrier frequency $f_c$ is approximately 9 MHz), a delay period of 36 nanoseconds for line 121, and with R equal to nine-tenths of the characteristic impedance of the delay line, 10 percent of the source voltage applied to delay line 121 is reflected 180° out-of-phase with the source and has traveled twice the length of the line before returning to the nonterminated delay line end. The total phase rotation is calculated to be $2\pi$ or 360° and the reflected signal is in phase with the main signal adding an additional 10 percent to the amplitude thereof. At 14 MHz, the 10 percent amplitude of the reflected signal will be subtracted. If the source signal to the delay line were plotted against a variation in frequency, for any given ratio between R and the characteristic impedance of the delay line, waveforms such as curves 38, 39 and 40 of FIG. 3 would be observed, each curve corresponding to a different impedance ratio. In FIG. 3, it is noted that the lower sideband and carrier frequencies are influenced in an opposite polarity sense relative to the higher sideband due to a change in the phase of the frequency/amplitude effect caused by the mismatched source impedance to the delay line. This opposite effect on the higher sideband however can be tolerated by virtue of a weighting factor introduced into the system by the straight line attenuation curve 34 which deemphasizes the effect at the higher band frequencies by a substantial ratio relative to the lower frequencies. The value of delay line 121 is selected to position the curves 38–40 such that the frequency/amplitude variations provided thereby occur as shown by FIG. 3 so as to afford an adjustment of the linearity of lower sideband amplitude. In this instance, delay 121 is selected to have a delay of 36 nanoseconds.

A circuit which has been found satisfactory for providing the function of variable impedance 151 is shown in detail in FIG. 6. Transistors 152 and 153 are a pair of complementary emitter followers. The signal received over line 86 is applied to the bases of these transistors and by using a very low source impedance these signals appear on the corresponding emitters with unity gain. Diodes 156 and 157 are forward biased by equal currents supplied from transistors 158 and 159. These transistors are controlled in a paraphase manner by transistor 161, which supplies a current thereto in proportion to the voltage on control line 37. The impedance of a diode may be varied from an extremely large value to a few ohms in response to a biasing current increasing from zero to its maximum design level. Accordingly, diodes 156 and 157 are arranged to provide the variable impedance in association with the input to delay line 121. Delay line 121 sees as a source impedance essentially the sum of the impedances of diode 156 and a resistor 163 in parallel with the impedance of diode 157 and a resistor 164, taken altogether in series with a trimming resistor 166. Resistors 167 and 168 provide a circuit path between input 86 and delay line 121 when diodes 156 and 157 are driven to cutoff by an excessive error voltage appearing on line 37. A resistor 169 affords a circuit path to ground for the biasing current occurring at the input of amplifier 124. The impedance of circuit 151 using the disclosed design provides an approximate range variation of ±30 percent of the characteristic impedance of delay line 121.

Finally, equalization network 14 and particularly equalizer 26 thereof is comprised of a low pass filter 171 which as shown in FIGS. 4 and 5 is serially connected in the signal path to receive the signals appearing at junction 127 as combined in a summing amplifier 172. Filter 171 is provided by conventional components and known construction so as to have a amplitude/frequency falloff as indicated by straight line equalization curve 34 of FIG. 3.

Returning to FIG. 1, disc recording system 10 as shown includes a plurality of record/reproduce transducer heads, in this instance heads Nos. 1, 2, 3 and 4, which are disposed for selective connection to an associated record or reproduce amplifier, amplifiers 180, by means of record/reproduce electronic switching means 181 as diagrammatically shown. The video signal is fed to heads Nos. 1–4 over a signal path including frequency modulator 58, record RF (radio frequency) gates 182, while one of the reproduce video signals developed by the heads is selectively passed to line 86 by means of reproduce RF gates 183. In this instance, while not shown, the disc machine consists of two magnetic discs to provide four available recording surfaces, with each of heads Nos. 1–4 being associated with one of these disc surfaces. During both recording and reproduction modes, record gates 182 and 183 respectively function to sequentially record or reproduce video fields on different concentric disc tracks by enabling the operation of one of the four available heads at a time in a programmed sequence.

What is claimed is:

1. An equalization circuit to compensate for nonuniform frequency response of a video signal passed through a frequency modulation signal system, comprising:

pilot signal insertion means for receiving said video signal prior to passage through said system and inserting a pilot signal of predetermined frequency into said video signal at first and second bias levels;

pilot signal extraction means for receiving said video signal subsequent to passage through said signal system and extracting said pilot signal therefrom;

equalization circuit means adapted to be serially cascaded with said signal system and having a first input control for adjusting the equalization of a first range of video signal frequencies and having a second input control for adjusting the equalization of a second range of video signal frequencies; and comparator means connected between said pilot signal extraction means and said equalization circuit means and being responsive to the amplitude of said pilot signal associated with said first bias level to issue a control signal to said first input control of said equalization circuit means and being responsive to said pilot signal associated with said second bias level to issue a control signal to said second input control of said equalization circuit means.

2. The equalization circuit of claim 1 further defined by said first and second bias levels being selected to represent the black and white reference levels respectively of said video signal.

3. The equalization circuit defined in claim 1, said equalization circuit comprising a voltage controlled variable resistance responsive to said first input control, said resistance having an input connected to receive said video signal and an output, a signal delay means having a characteristic impedance within the impedance range of said variable resistance and having an input connected to said variable resistance output, output amplifier means connected to an output of said delay means and having an input impedance substantially greater than said characteristic impedance, and a variable amplitude controlled phase circuit responsive to said second input control and having an input connected to the input of said delay means, and summing amplifier means connected to receive output signals from said output amplifier and said variable amplitude controlled phase circuit.

4. The equalization circuit as defined in claim 1, wherein said pilot signal extraction means comprises a band-pass filter receiving said video signal and extracting said pilot signal therefrom, detector means connected to said band-pass filter and issuing a signal representing the amplitude of said pilot signal, a sync separator receiving said video signal and issuing a sequence of signal pulses representing the vertical synchronizing waveform thereof, first and second sample and hold circuit means each having an input connected to said detector means and an output connected to said comparator means, and switching circuit means connected between said sync separator and said first and second sample and hold circuit means for operation thereof to sample the amplitude of said pilot signal in response to said sequence of pulses at times corresponding to said first and second pilot signal bias levels respectively.

5. The equalization circuit as defined in claim 1 wherein said pilot signal insertion means comprises a sync separator receiving said video signal and issuing a sequence of electrical pulses representing the vertical blanking waveform, and a switching circuit responsive to certain of said electrical pulses to insert said pilot signal alternately at said first and second bias levels.

6. The equalization circuit as defined in claim 5 wherein said pilot signal insertion means further comprises a pilot signal generator for generating said pilot signal, a signal mixer disposed to receive said video signal and said pilot signal, a bias signal source, and said switching circuit comprises a gating circuit selectively connecting said pilot signal generator and bias source to said mixer in response to said sequence of electrical pulses.

7. A method of equalizing nonuniform frequency response of a video signal passed through a frequency modulation signal system, the steps comprising:

inserting a pilot signal of predetermined frequency onto said video signal prior to its passage through said system, said pilot signal being alternately biased at first and second bias levels;

extracting said pilot signal from said video signal subsequent to passage through said signal system;

comparing the extracted pilot signal associated with each bias level with preselected reference signals and developing frequency response error signals associated with said first and second bias levels of said pilot signal; and equalizing the signal passed through said system over a first range of frequencies in response to the error signal associated with the first bias level of said pilot signal and equalizing the same signal over another range of frequencies in response to the error signal associated with the second bias level of said pilot signal.

8. The method as defined in claim 7 wherein said pilot signal is inserted onto the vertical blanking waveform of the video signal with said first and second bias levels alternating between adjacent pulses of such waveform.

9. The method as set forth in claim 7 further defined by said first and second bias levels being selected to correspond substantially to the black and white reference levels respectively of said video signal.

* * * * *